United States Patent
Frank et al.

(10) Patent No.: US 12,291,134 B2
(45) Date of Patent: May 6, 2025

(54) VEHICLE SEAT ASSEMBLY

(71) Applicants: NISSAN NORTH AMERICA, INC., Franklin, TN (US); Adient US LLC, Plymouth, MI (US)

(72) Inventors: Evan Frank, West Bloomfield, MI (US); Steven P. Livesey, Walled Lake, MI (US); Martin Murau, Ann Arbor, MI (US)

(73) Assignees: Nissan North America, Inc., Franklin, TN (US); Adient US LLC, Plymouth, MI (US)

( * ) Notice: Subject to any disclaimer, the term of this patent is extended or adjusted under 35 U.S.C. 154(b) by 287 days.

(21) Appl. No.: 17/897,104

(22) Filed: Aug. 26, 2022

(65) Prior Publication Data

US 2024/0067062 A1 Feb. 29, 2024

(51) Int. Cl.
*B60N 2/30* (2006.01)

(52) U.S. Cl.
CPC .......... *B60N 2/3011* (2013.01); *B60N 2/3088* (2013.01)

(58) Field of Classification Search
CPC .................................. F16F 1/38; F16F 1/3873
See application file for complete search history.

(56) References Cited

U.S. PATENT DOCUMENTS

| | | | |
|---|---|---|---|
| 4,620,743 A | 11/1986 | Eke | |
| 5,921,611 A | 7/1999 | Townsend | |
| 6,234,563 B1 | 5/2001 | Bascou | |
| 6,386,613 B1 | 5/2002 | Vader | |
| 7,828,366 B2 | 11/2010 | Andre et al. | |
| 8,376,449 B2 | 2/2013 | Kitayama et al. | |
| 8,668,272 B2* | 3/2014 | Sankaran | B60N 2/68 297/284.7 |
| 10,549,670 B1* | 2/2020 | Smith | B60N 2/938 |
| 11,332,050 B1* | 5/2022 | Aktas | B60N 2/22 |
| 2004/0084946 A1* | 5/2004 | Bonk | B60N 2/305 297/378.14 |
| 2014/0056639 A1* | 2/2014 | Wroblewski | B60N 2/01583 403/327 |
| 2017/0008426 A1* | 1/2017 | Stesl | B60N 2/682 |
| 2019/0351788 A1* | 11/2019 | Kimura | B60N 2/10 |
| 2020/0198787 A1* | 6/2020 | Rao | A47C 7/566 |

(Continued)

FOREIGN PATENT DOCUMENTS

| | | |
|---|---|---|
| CN | 1309614 A | 8/2001 |
| WO | 2005080108 A1 | 9/2005 |

(Continued)

*Primary Examiner* — Gregory A Blankenship
(74) *Attorney, Agent, or Firm* — Global IP Counselors, LLP

(57) ABSTRACT

A vehicle seat assembly includes a pivot structure, a seat and a bushing. The pivot structure has at least one link member that includes a pivot pin extending through an opening in the at least one link member. The pivot pin defines a pivot axis about which the at least one link member pivots. The seat is attached to the pivot structure. The pivot structure and the seat are configured to move between a seating or in-use orientation and a rear access orientation. The bushing is fitted into the opening of the at least one link member with the pivot pin extending through the bushing. The bushing is configured to deflect in response to movement of the link member relative to the pivot pin.

11 Claims, 12 Drawing Sheets

(56) References Cited

U.S. PATENT DOCUMENTS

| | | | |
|---|---|---|---|
| 2021/0061141 A1* | 3/2021 | Pistilli | B60N 2/68 |
| 2021/0094449 A1* | 4/2021 | Pistilli | B60N 2/01 |
| 2021/0197693 A1* | 7/2021 | Runde | B60N 2/067 |
| 2023/0211710 A1* | 7/2023 | Cherukuvada | B60N 2/686 |
| | | | 296/65.01 |
| 2024/0067062 A1* | 2/2024 | Frank | B60N 2/3088 |
| 2024/0102527 A1* | 3/2024 | Mayer | F16F 1/3732 |
| 2024/0140279 A1* | 5/2024 | Kaemmerer | B60N 2/3004 |

FOREIGN PATENT DOCUMENTS

| | | |
|---|---|---|
| WO | 2015097321 A1 | 7/2015 |
| WO | 2020181681 A1 | 9/2020 |

\* cited by examiner

VEHICLE SEAT ASSEMBLY

BACKGROUND

Technical Field

The present disclosure generally relates to a vehicle seat assembly. More specifically, the present disclosure relates to a vehicle seat assembly with a pivot structure that facilitates movement of the seat assembly between an in-use orientation and a rear access orientation and has bushings that dampen oscillations that occur between pivoting structural elements of the pivot structure.

Background Information

Vehicles with rear cargo areas or third row seats typically have second row seat assemblies that move between an in-use (or at rest) orientation and a rear access orientation. Various structural elements of the seat assembly can vibrate or undergo oscillations during this movement. Such oscillations can produce undesirable rattling noises.

SUMMARY

One object of the present disclosure is to provide a pivot structure of a vehicle seat assembly with a bushing that is configured to undergo cantilevering elastic deformation in order to cushion oscillations produced during movement of the seat assembly between an in-use or at rest orientation and a rear access orientation.

In view of the state of the known technology, one aspect of the present disclosure is to provide a vehicle seat assembly with a pivot structure, a seat and a bushing. The pivot structure has at least one link member that includes a pivot pin extending through an opening in the at least one link member. The pivot pin defines a pivot axis about which the at least one link member pivots. The seat is attached to the pivot structure. The pivot structure and the seat are configured to move between a seating or in-use orientation and a rear access orientation. The bushing is fitted into the opening of the at least one link member with the pivot pin extending through the bushing. The bushing is configured to deflect in response to movement of the link member relative to the pivot pin.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
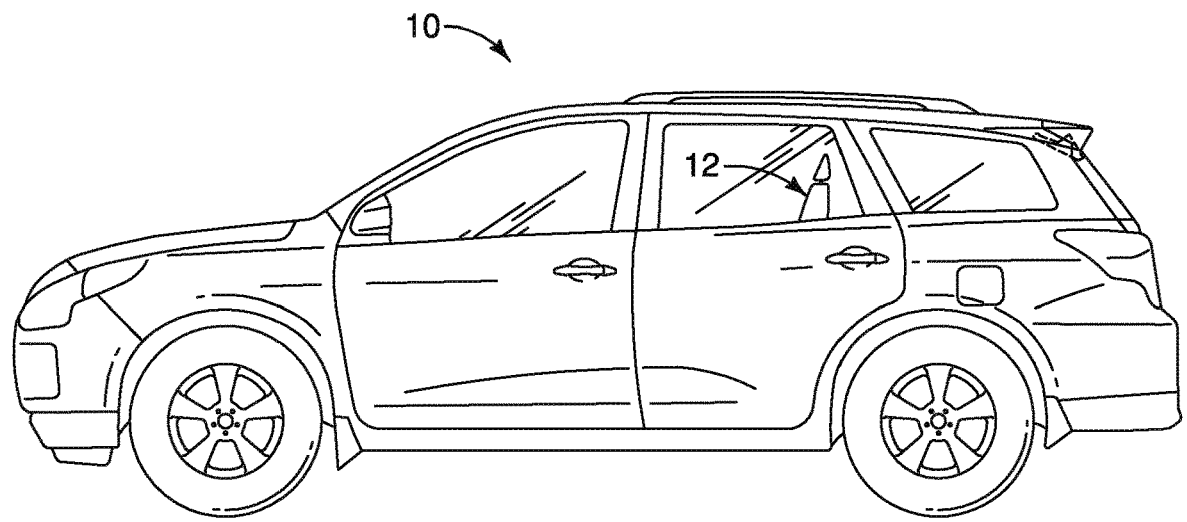
FIG. 1 is a side view of a vehicle that includes a second-row seat assembly in accordance with an exemplary embodiment.
Figure 2:
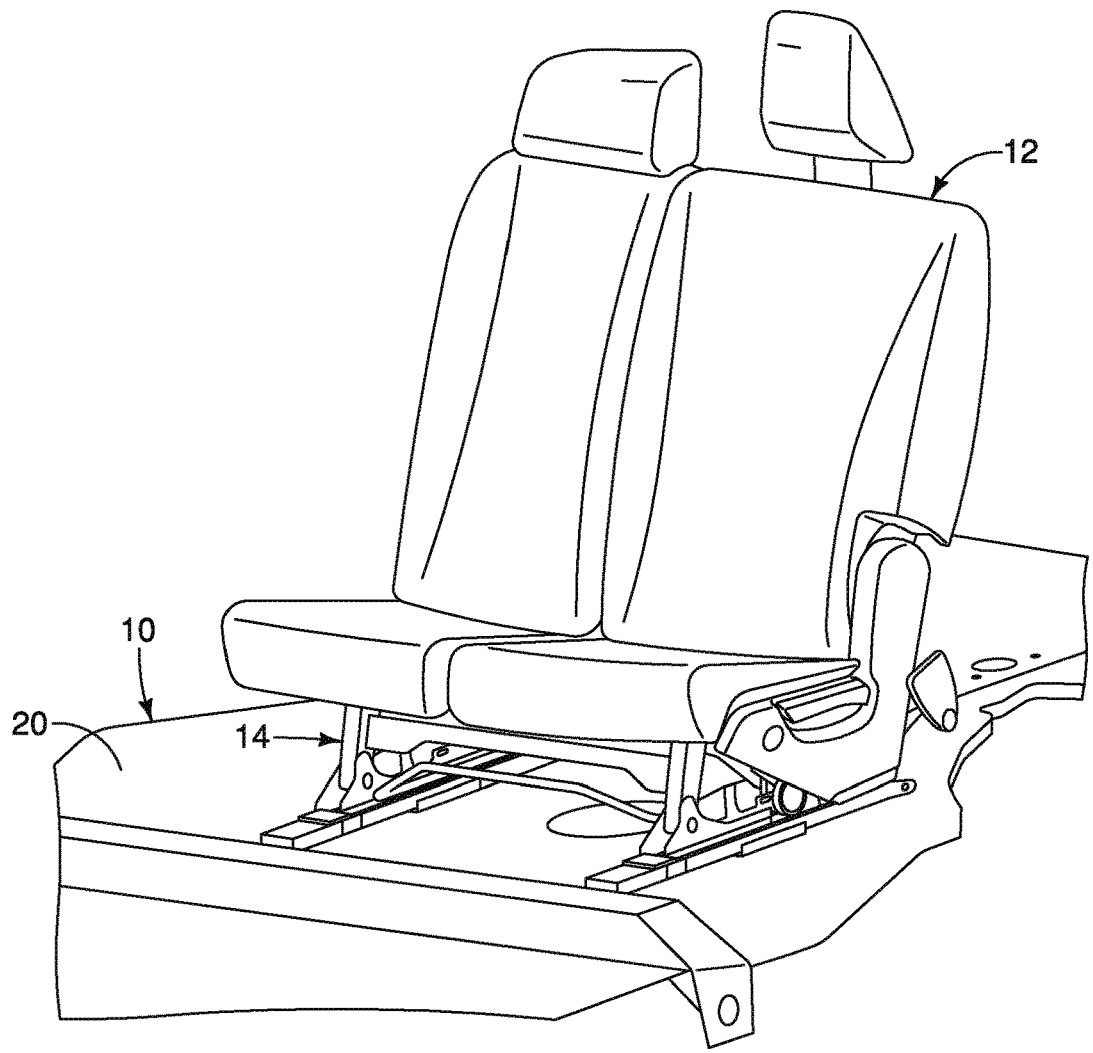
FIG. 2 is a perspective view of the second-row seat assembly having a pivot structure with the seat assembly shown in an in-use or at rest orientation in accordance with the exemplary embodiment.

Referring initially to FIGS. 1 and 2, a vehicle 10 having a vehicle seat assembly 12 is illustrated in accordance with a first embodiment. The vehicle seat assembly 12 includes a pivot structure 14 (shown in FIGS. 3-7) having a plurality of pivot pins 16 (FIGS. 10-12), each pin 16 having a bushing 18 (FIGS. 8-17 and 19-23) installed thereto, as described below with specific reference to FIGS. 8-23.

The vehicle 10 includes a passenger compartment with a floor 20, as shown in FIG. 2 with side walls and doors of the vehicle 10 removed in order to show the pivot structure 14 fixed to the floor 20 in order to support the vehicle seat assembly 12.

Figure 3:
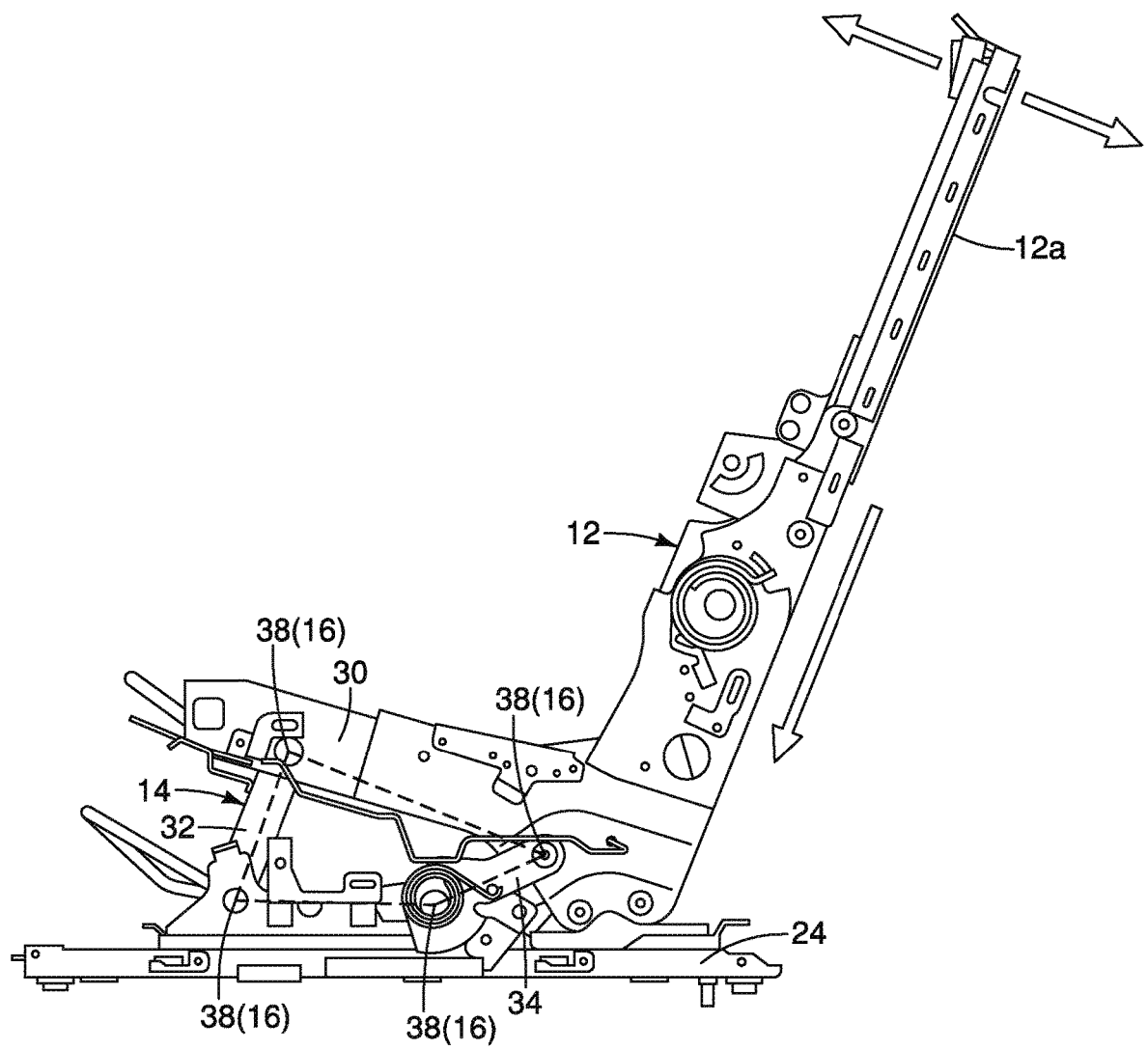
FIG. 3 is a side view of the seat assembly with cushioning material removed showing elements of the pivot structure and other structural elements of the seat assembly in the in-use or at rest orientation in accordance with the exemplary embodiment.
Figure 4:
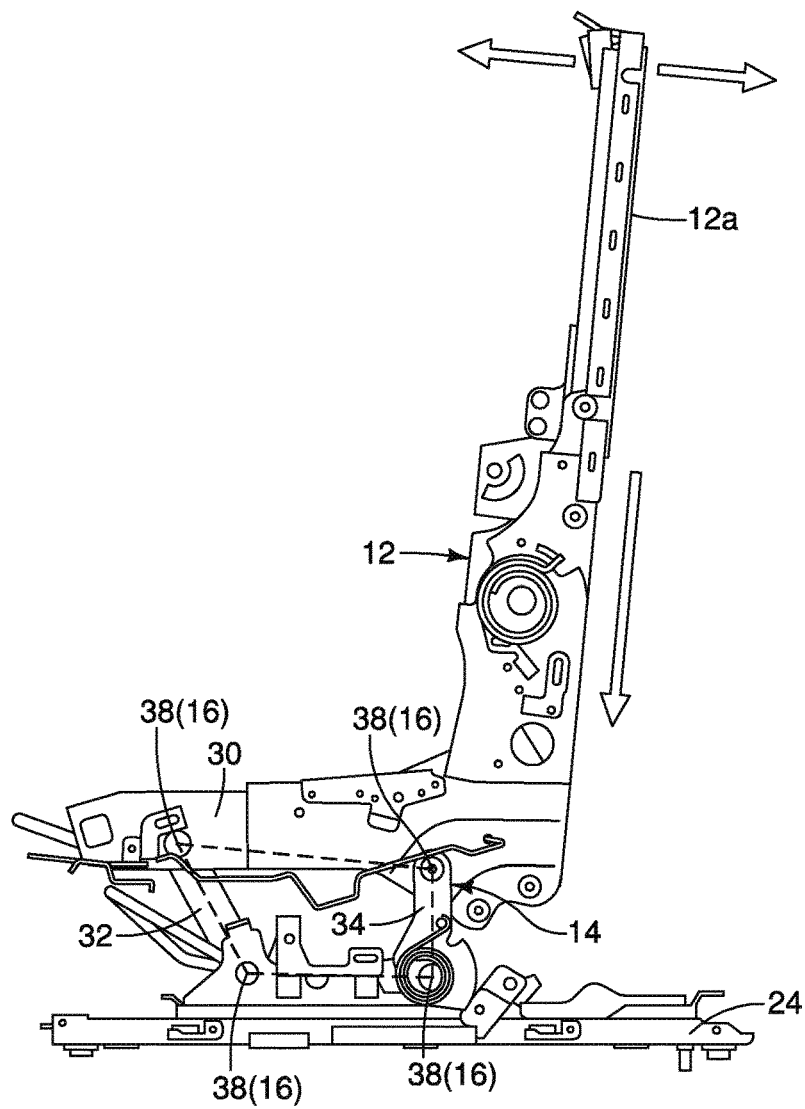
FIG. 4 is another side view of the seat assembly with cushioning material removed showing elements of the pivot structure and other structural elements of the seat assembly in a retracted or rear access orientation in accordance with the exemplary embodiment.
Figure 5:
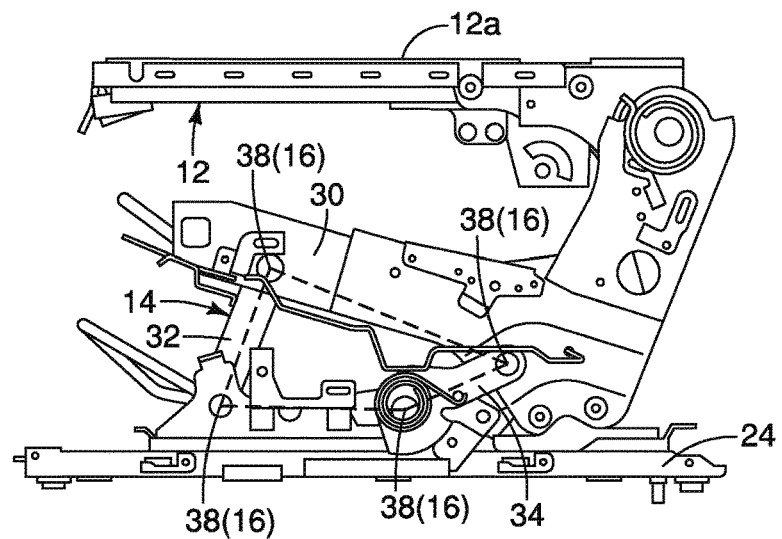
FIG. 5 is yet another side view of the seat assembly with cushioning material removed showing elements of the pivot structure and other structural elements of the seat assembly in a cargo space extending orientation in accordance with the exemplary embodiment.

The vehicle seat assembly 12 (hereinafter the seat assembly 12) is movable between several positions, as shown in FIGS. 3, 4 and 5. In FIGS. 2 and 3, the seat assembly 12 is in an in-use orientation such that passengers (not shown) can sit on the seat assembly 12. As shown in FIG. 4, the seat assembly 12 can be pivoted via the kinematic configuration of the pivot structure 14 to a forward orientation allowing access to space rearward of the seat assembly 12. As shown in FIG. 5, the seat assembly 12 is returned to the in-use orientation depicted in FIGS. 2 and 3 but is further moved to a cargo carrying orientation. The cargo carrying orientation is also referred to as a rear access orientation. Specifically, the upper section 12a of the seat assembly 12 can be pivoted downward to lay flat on the seat cushion usually in a co-planar manner relative to a floor of a cargo space rearward of the seat assembly 12.

Figure 6:
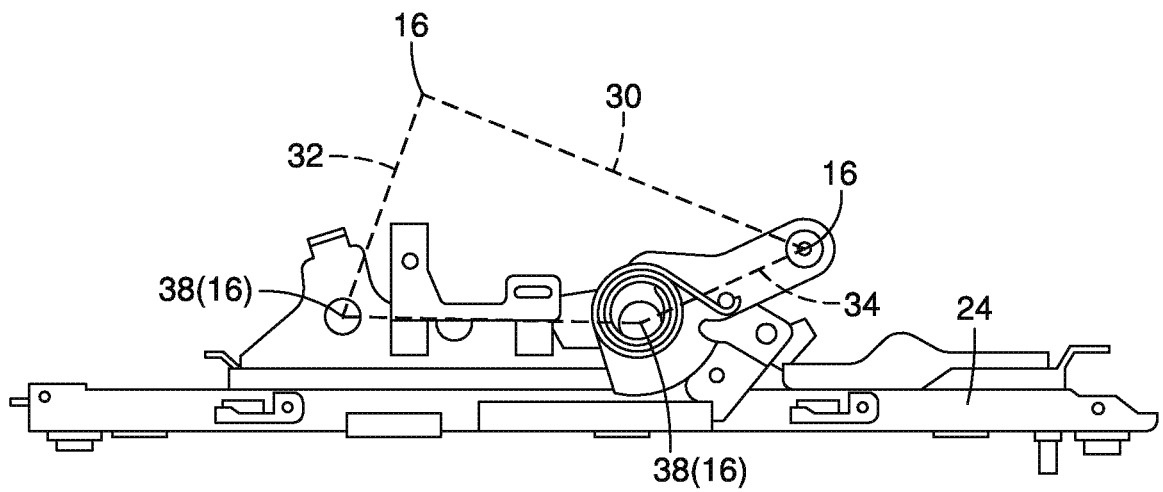
FIG. 6 is a schematic view of the pivot structure showing the location of pivot pins and links in the in-use or at rest orientation, the pivot pins and links facilitating movement of the seat assembly accordance with the exemplary embodiment.
Figure 7:
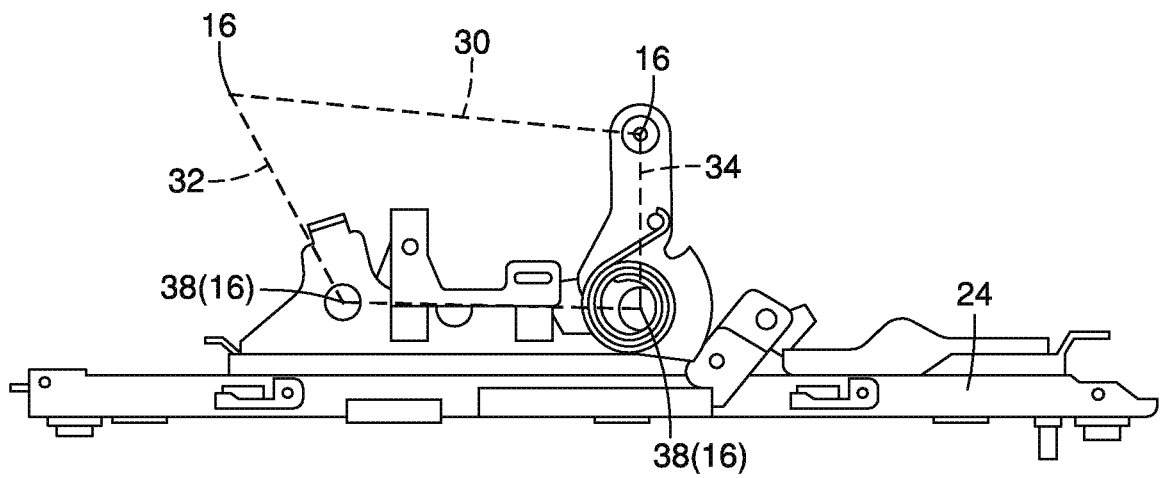
FIG. 7 is another schematic view of the pivot structure showing the location of pivot pins and links in the retracted or rear access orientation, the pivot pins and links facilitating movement of the seat assembly accordance with the exemplary embodiment.

FIG. 6 shows the pivot structure 14 with the seat assembly 12 in the in-use orientation. FIG. 7 shows the pivot structure 14 with the seat assembly 12 in the forward orientation.

Figure 8:
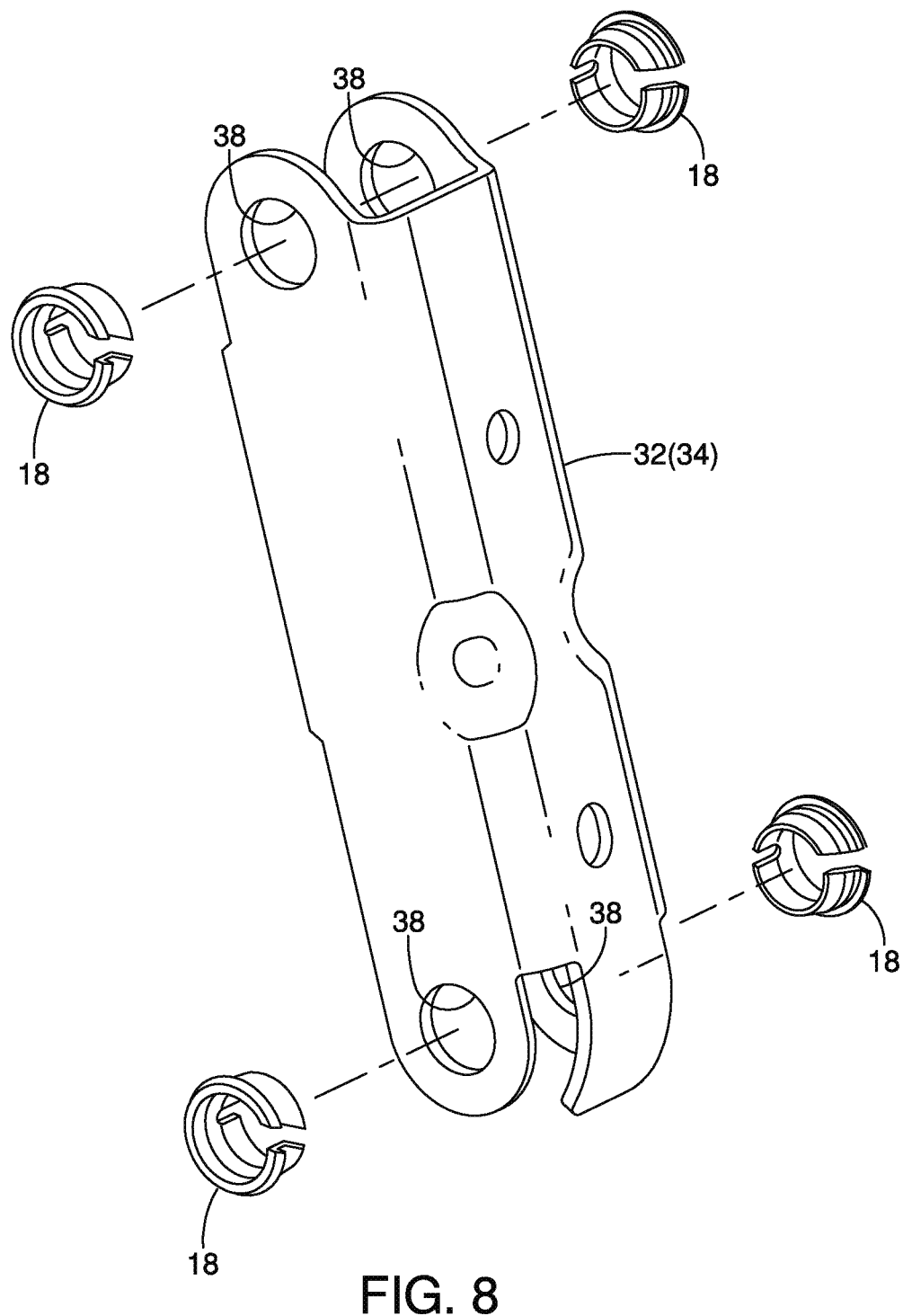
FIG. 8 is a perspective view of one of the links removed from the pivot structure showing bushings to be installed in openings of the one of the links in accordance with the exemplary embodiment.
Figure 9:
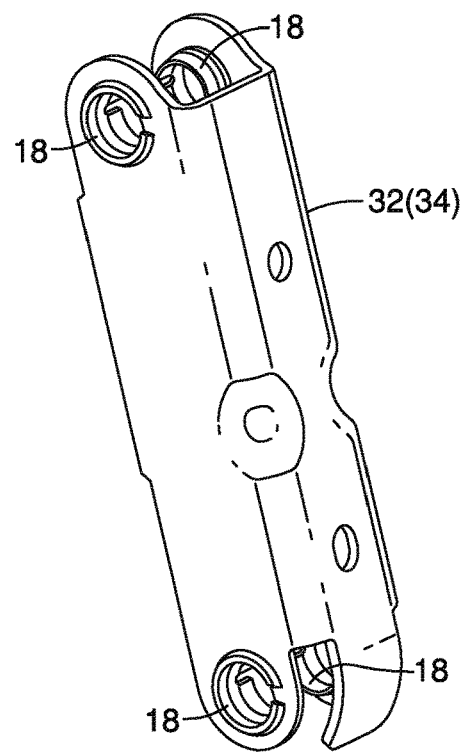
FIG. 9 is another perspective view of the one of the links similar to FIG. 8 the bushings installed in openings of the one of the links in accordance with the exemplary embodiment.

A description of the pivot structure 14 is now provided with specific reference to FIGS. 3-4 and 6-7. The pivot structure 14 basically includes a base structure 24 of the seat assembly 12, the base structure 24 having pivot openings 36 and 36a (see FIGS. 10-12), pivot openings 36 and 36a along the bottom structure 30 of the seat assembly 12, a pair of links 32 and a pair of links 34. Each of the pair of links 32 and pair of links 34 have pivot openings 38 at opposite ends thereof, as shown in FIG. 8.

The pair of links 32 are basically identical to one another. The pair of links 34 are also basically identical to one another. Therefore, description of one link 32 and one link 34 applies equally to both links 32 and both links 34, respectively.

Figure 10:
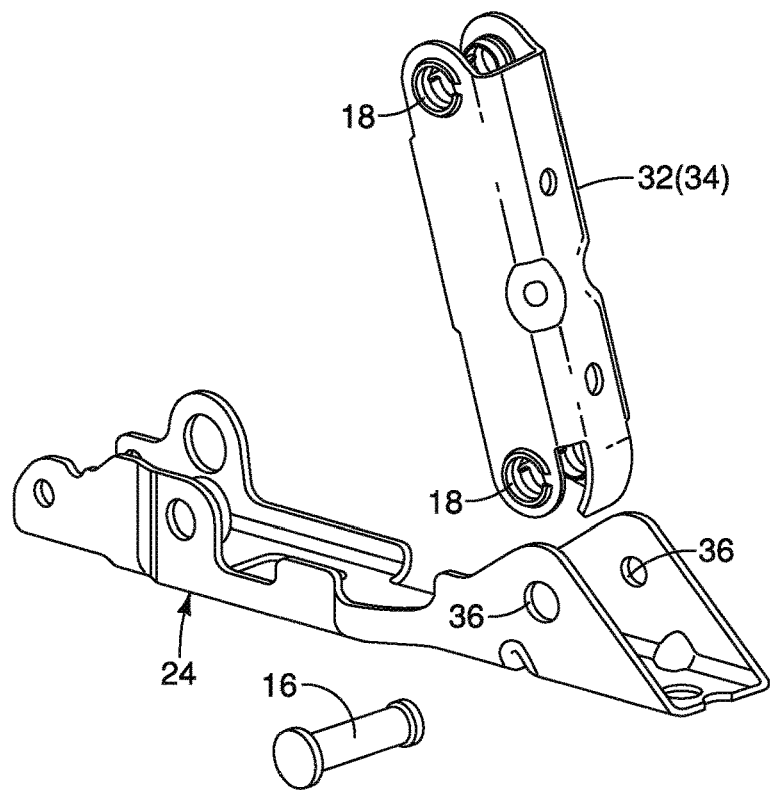
FIG. 10 is still another perspective view of one of the links showing a pivot pin in the process of being inserted into a pair of the bushings thereby attaching the link to a base structure of the seat assembly in accordance with the exemplary embodiment.
Figure 11:
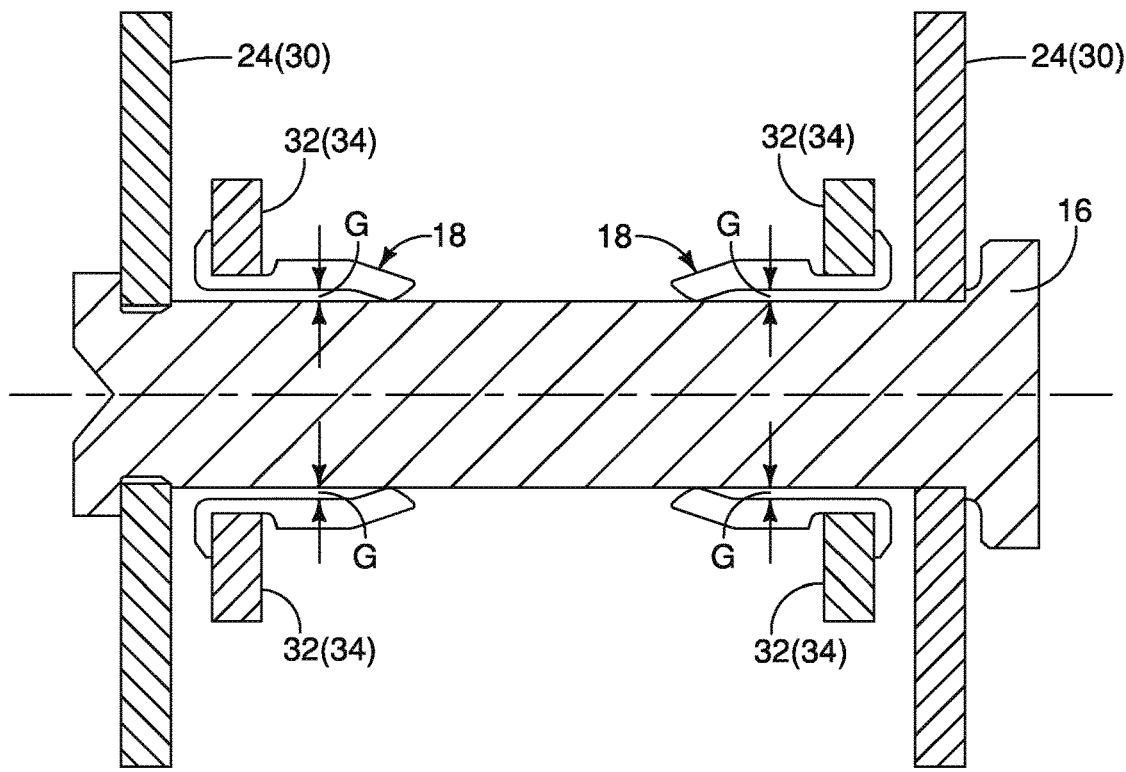
FIG. 11 is a front cross-sectional view of one end of the link showing two bushings and a rivet (one type of pivot pin) attaching the link to one of the base structure and a bottom structure of the seat assembly in accordance with the exemplary embodiment.
Figure 12:
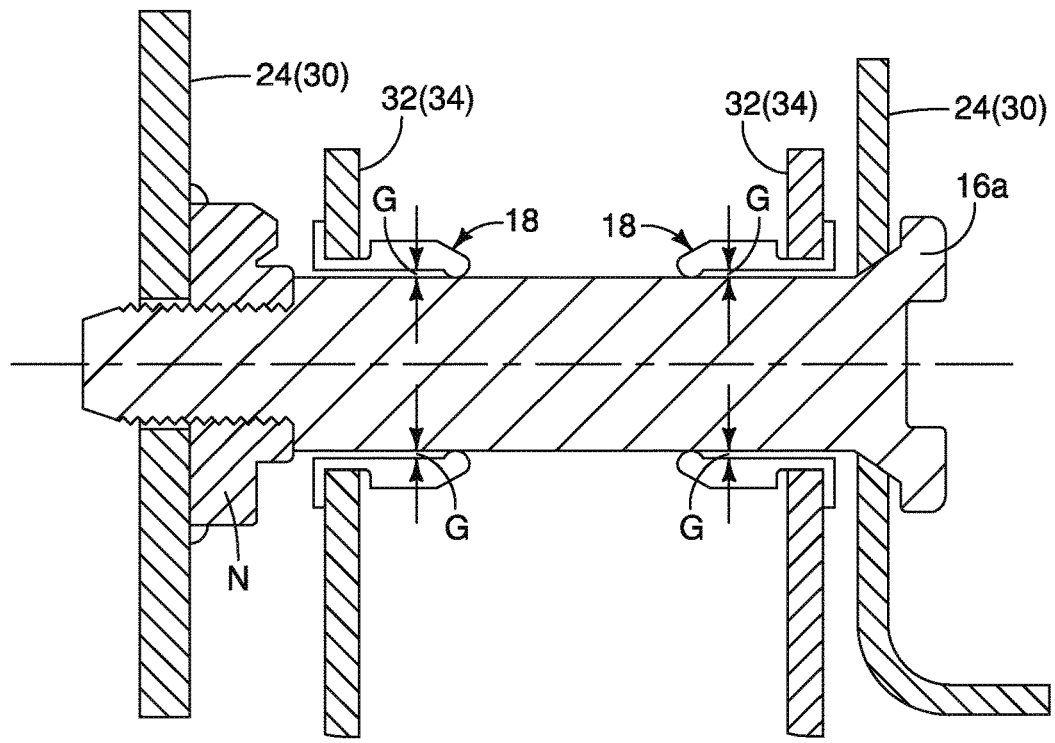
FIG. 12 is another front cross-sectional view of one end of the link showing two bushings and a threaded bolt (another type of pivot pin) attaching the link to one of the base structure and the bottom structure of the seat assembly in accordance with the exemplary embodiment.
Figure 13:
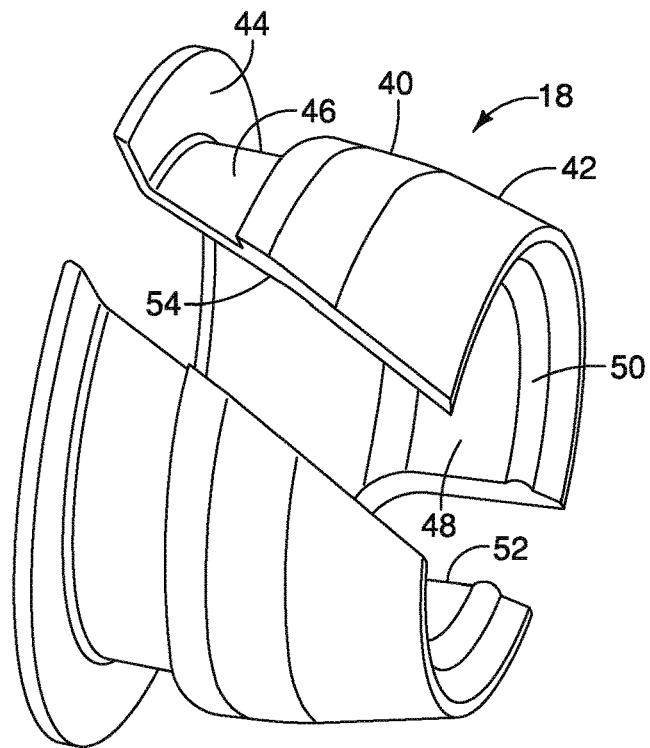
FIG. 13 is a perspective view of one of the bushings shown removed from the link in accordance with the exemplary embodiment.
Figure 14:
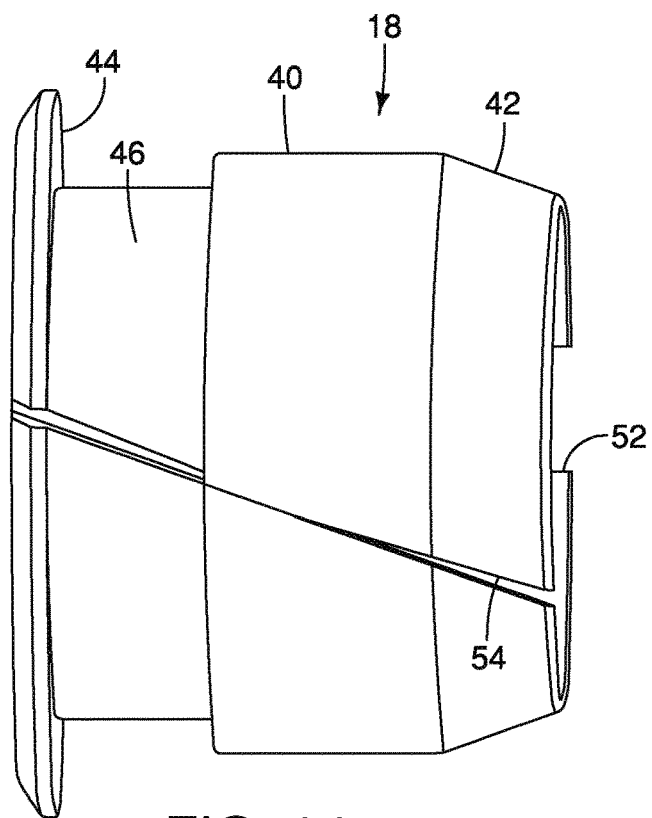
FIG. 14 is a side view of the one of the bushings in accordance with the exemplary embodiment.
Figure 15:
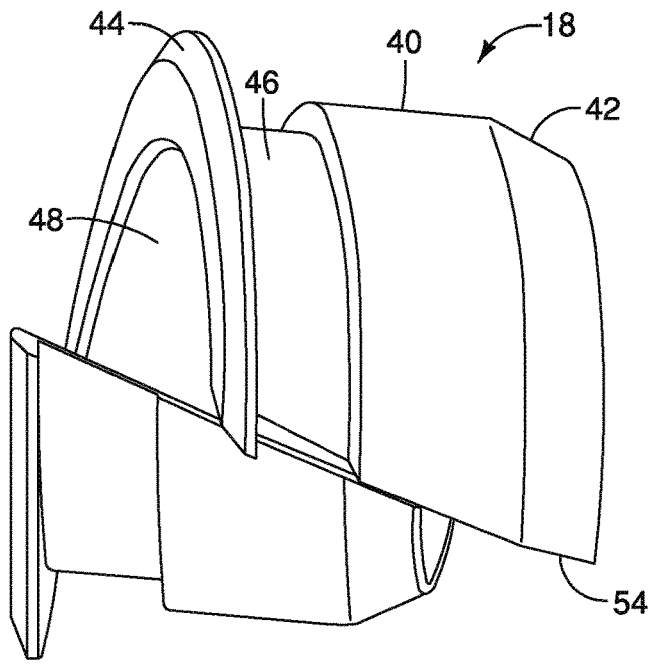
FIG. 15 is another side view of the bushing slightly compressed prior to insertion into one of the openings of the link in accordance with the exemplary embodiment.
Figure 16:
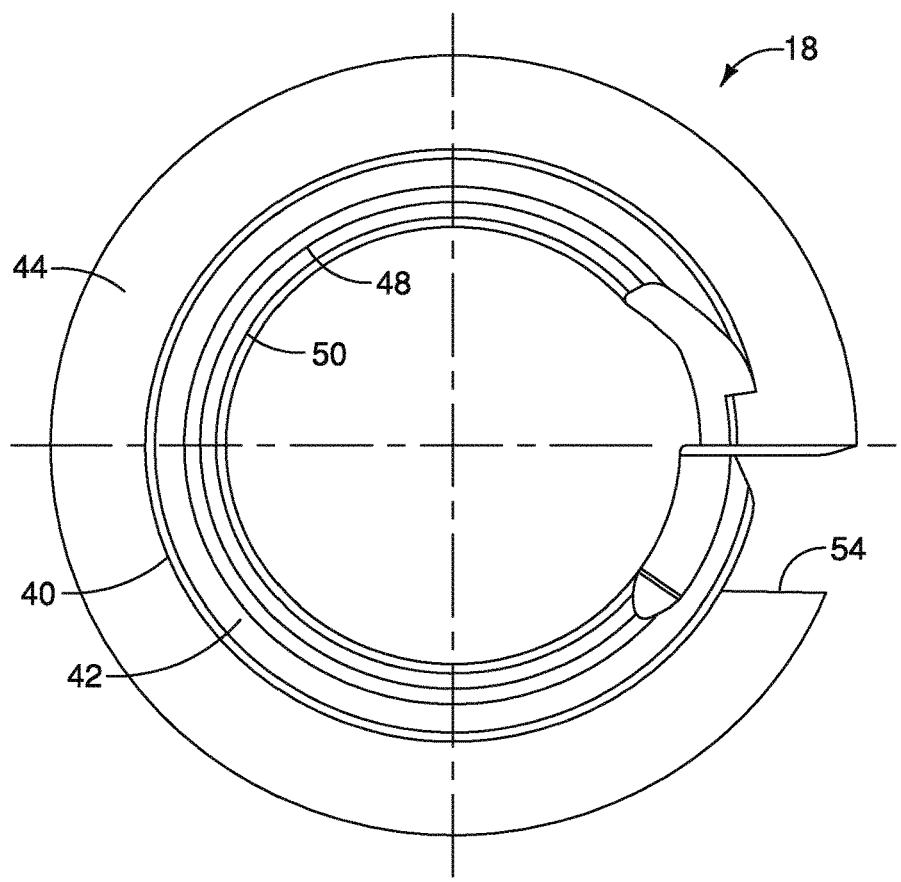
FIG. 16 is an end view of the bushing in accordance with the exemplary embodiment.

Each of the openings 38 are dimensioned to receive a corresponding one of the bushings 18, as shown in FIGS. 8-12. Similarly, the openings 36 and 36a receive a corresponding one of the plurality of pivot pins 16 which also extend through a corresponding one of the bushings 18, as best shown in FIGS. 10, 11 and 12.

As shown schematically in FIGS. 6 and 7, the pivot structure 14 is designed and dimensioned to allow the seat assembly 12 to pivot between the in-use orientation shown in FIGS. 3 and 6 and the cargo carrying orientation shown in FIGS. 4 and 7. Thus, as shown schematically in FIGS. 6 and 7, the bottom structure 30 of the seat assembly 12 moves between the two depicted orientations as the links 32 and 34 pivot about the pivot pins 16 that extend through the openings 36 and 36a of the bottom structure 30. As well, the links 32 and 34 pivot about the pivot pins 16 that extend through the openings 36 and 36a of the base structure 24. The pivot pins 16 are non-movably fixed to the base structure 24 and the bottom structure 30. Hence, the pivot pins 16 do not pivot relative to the base structure 24 and the bottom structure 30.

The links 32 and 34 and the pivot pins 16 are preferably made of metal and can therefore make noises (i.e. rattling noises) while moving in the absence of the bushings 18. Hence, a corresponding one of the bushings 18 is inserted into respective one of the openings 38 of the links 32 and 34 and the pivot pins 16 are inserted into corresponding ones of the bushings 18, as shown in FIGS. 11 and 12.

The links 32 have a differing overall length than the links 34. However, for purposes of describing the pivot pins 16 and the bushings 18, the links 32 and 34 will be considered the same, since the links 32 and 34 all have openings 38.

As shown in FIG. 8, individual ones of the bushings 18 are inserted into respective ones of the openings 38 of the links 32 and 34.

A description of one of the bushings 18 is now provided with specific reference to FIGS. 11-17. The bushing 18 includes a cylindrically shaped portion 40, a tapered portion 42, an outer annular ring 44, a recessed portion 46, an inner surface 48 and an inner annular ring 50. The bushing 18 and a recess 52 and a split 54 that are dimensioned and shaped for ease of installation into the openings 38. The recess 52 is optional but can be formed to extend from a small section of the tapered portion 42 part-way into the cylindrically shaped portion 40. The split 54 extends completely through the bushing 18 from the tapered portion 42 through the outer annular ring 44. The split 54 is generally linear as viewed from the side in FIGS. 13 and 14 but is not parallel to a central axis defined by the bushing 18. More specifically, as viewed from the side in FIG. 14, the split 54 is inclined in a direction extending from the outer annular ring 44 to the tapered portion 42.

The split 54 is desirable because the bushing 18 is made of a very stiff polymer, nylon, plastic and/or rubber-like material that has limited flexibility but has sufficient flexibility to undergo cantilevering elastic deformation, as described in greater detail below.

Once the bushing 18 is installed to the corresponding opening 38 of one of the links 32 or 34, the recessed portion 46 receives and retains those portions of the one of the links 32 or 34 that define the opening 38.

Figure 17:
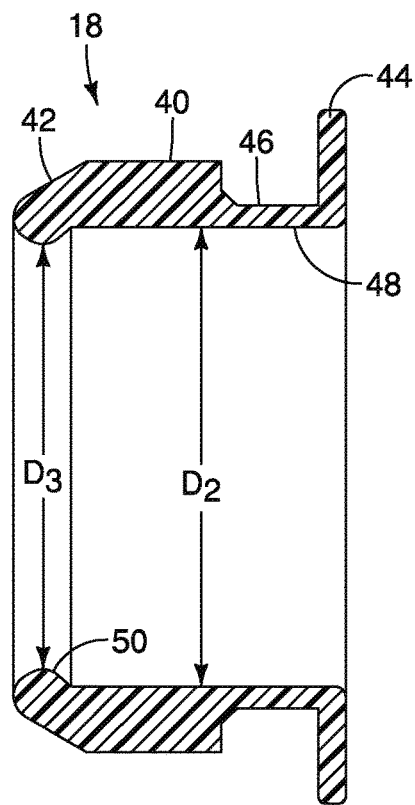
FIG. 17 is a cross-sectional side view of the bushing showing an inner surface and an inner annular ring of the bushing in accordance with the exemplary embodiment.
Figure 18:
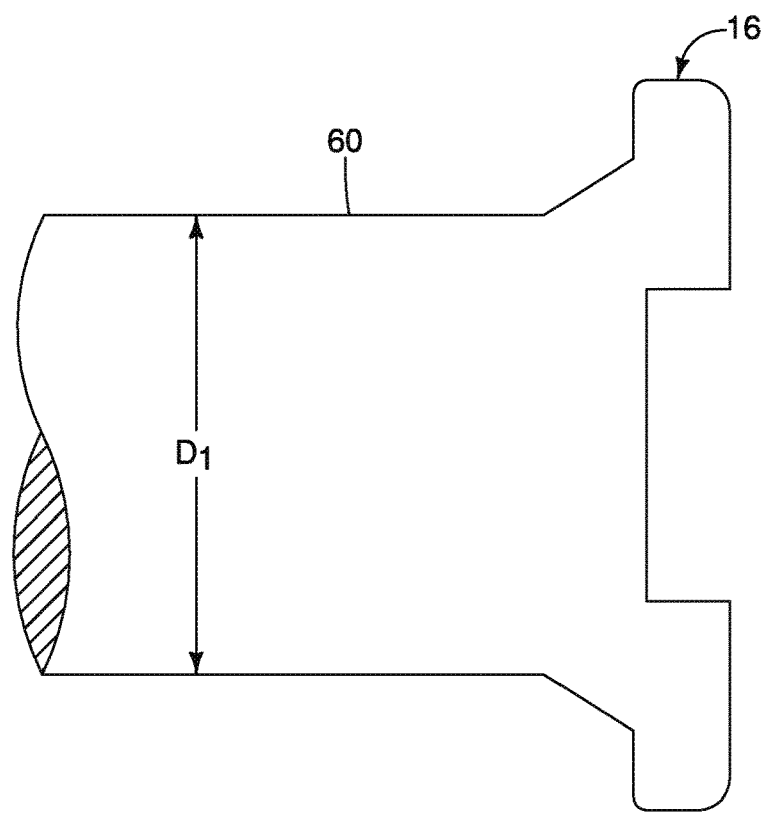
FIG. 18 is a side view of one of the pivot pins in accordance with the exemplary embodiment.

As shown in FIG. 18, a shaft portion of the pivot pin 16 has an outer diameter $D_1$. All of the pivot pins 16 used in the seat assembly 12 have a shaft portion with an outer diameter $D_1$. As shown in FIG. 17, the inner surface 48 of the bushing 18 defines an inner diameter $D_2$. Further as is also shown in FIG. 17, the inner annular ring 50 of the bushing 18 defines another inner diameter $D_3$.

Figure 19:
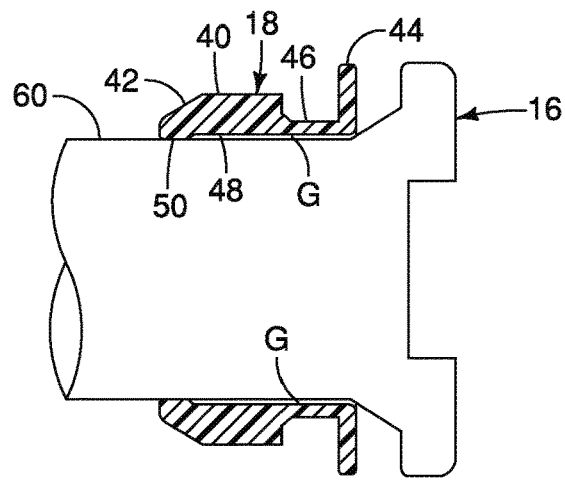
FIG. 19 is a cross-sectional view of the one of the pivot pins and the bushing installed to one another with the inner annular ring being tightly compressed around the outer surface of the pivot pin and the inner surface of a cylindrically shaped portion of the bushing and the outer surface of the pivot pin defining a gap or clearance therebetween in accordance with the exemplary embodiment.

The outer diameter $D_1$ of the pivot pin 16 is smaller than the inner diameter $D_2$ of the bushing 18. However, the outer diameter $D_1$ of the pivot pin 16 is larger than the inner diameter $D_3$ of the inner annular ring 50. Thus, in order to install the pivot pin 16 into the bushing 18 (with the bushing installed to one of the links 32 and 34) a small amount of force is required in order to compress the inner annular ring 50. Therefore, as shown in FIG. 19, with the seat assembly 12 in the at-rest orientation (also referred to as the in-use orientation), the inner annular ring of the bushing 18 is tightly fitted around the pivot pin 16.

For example, in one embodiment of the bushing 18 and pivot pin 16, the outer diameter $D_1$ of the pivot pin 16 is 12.58 mm ($D_1$); the inner diameter $D_2$ of the bushing 18 is 13.2 mm; and the inner diameter $D_3$ of the inner annular ring 50 is 12.12 mm. This embodiment shows that the inner diameter $D_3$ is approximately 4% smaller that the outer diameter $D_1$. Alternatively, the inner diameter $D_3$ can be any value between 1% to 5% smaller than the outer diameter $D_1$ of the pivot pin 16, depending upon the overall size and design of the seat assembly 12 and the pivot structure 14. Further, in this embodiment, the outer diameter $D_1$ of the pivot pin 16 is approximately 5% smaller than the inner diameter $D_2$ of the bushing 18. Alternatively, the outer diameter $D_1$ of the pivot pin 16 can be between 2% and 8% smaller than the inner diameter $D_2$ of the bushing 18, depending upon the overall size and design of the seat assembly 12 and the pivot structure 14.

As shown in FIG. 11, the pivot pin 16 can be a rivet installed to the bushing 18, link 32 or 34 and either the base structure 24 of the seat assembly 12 (and pivot structure 14) or the bottom structure 30 of the seat assembly 12.

As shown in FIG. 12, the pivot pin 16 can be a threaded bolt with a threaded end installed to a nut N that is welded to one of the base structure 24 of the seat assembly 12 (and pivot structure 14) or the bottom structure 30 of the seat assembly 12. Both the pivot pin 16 as a bolt and the pivot pin 16 as a rivet are used with the seat assembly 12 and the pivot structure 24 because some locations under the seat assembly 12 are accessed in such a way that use of a rivet is more advantageous that use of a threaded bolt and vis-verse.

As shown in FIG. 3, the seat assembly 12 rests on the base structure 24 when in the in-use orientation. Therefore, when in the in-use orientation the seat assembly 12 puts little or no pressure on the links 32 and 34 or the bushings 18. Further, as shown in FIG. 19 a gap G is established between the inner surface 48 of the bushing 18 and the outer surface 60 of the pivot pin 16 with the seat assembly 12 in the in-use orientation. In other words, with the seat assembly 12 in the in-use orientation the inner annular ring 50 contacts the outer surface 60 of the pivot pin 16 and the inner surface 48 of the bushing 18 is spaced apart from the outer surface 60 of the pivot pin 16 defining the gap G. Put another way, there is clearance between the inner surface 48 of the bushing 18 is spaced apart from the outer surface 60 of the pivot pin 16. Further, the gap G is generally uniform or constant around the outer surface 60 of the pivot pin 16 with the seat assembly 12 in the in-use orientation.

During movement of the seat assembly 12 between the seating orientation (FIG. 3) and the rear access orientation (FIG. 4), the weight of the seat assembly 12 is applied to the bushings 18 and pivot pins 16. As the seat assembly 12 is moved between the seating orientation (FIG. 3) and the rear access orientation (FIG. 4), the various forces acting on the bushings 18 and pivot pins 16 cause a cantilevering elastic deformation of the bushings 18 as demonstrated in FIGS. 20, 21 and 22.

Specifically, the movement of the seat assembly 12 produces oscillations between the links 32 and 34, the base structure 24 and the bottom structure 30 of the seat assembly 12. In the absence of the bushings 18, such oscillations produce rattling and other undesirable noises. The design of the bushings 18 is such that such oscillations are cushioned by the resilient material used to manufacture the bushings 18.

Figure 20:
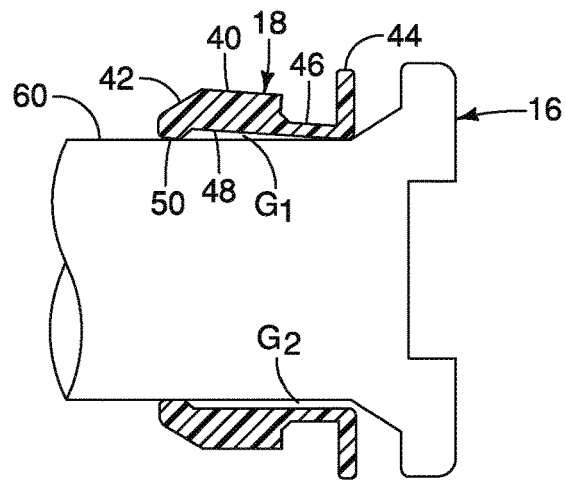
FIG. 20 is another cross-sectional view of the pivot pin and bushing with the bushing undergoing deformation during a first phase of oscillation between the pivot pin and the bushing in accordance with the exemplary embodiment.
Figure 22:
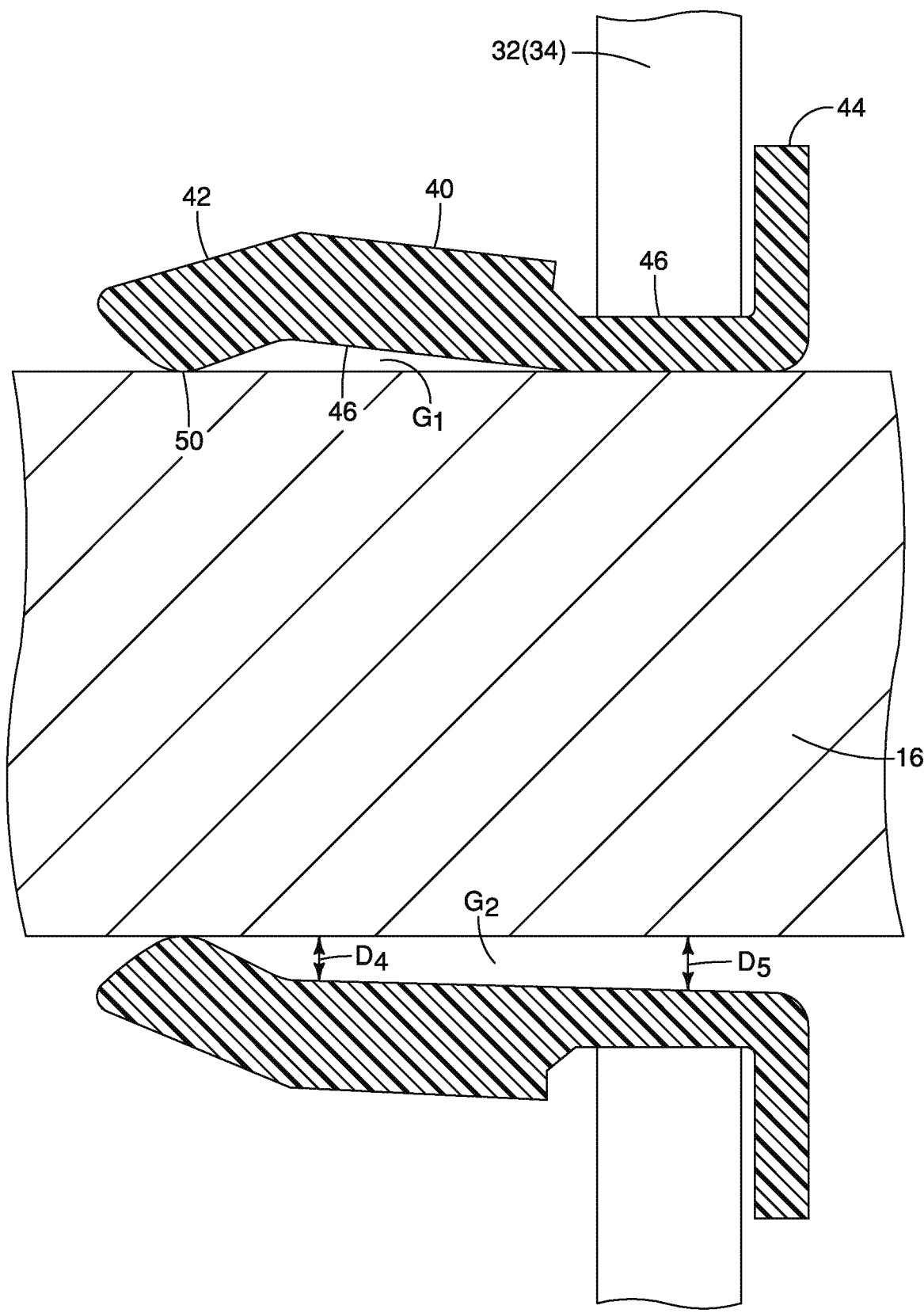
FIG. 22 is a schematic cross-sectional view of the pivot pin and bushing similar to FIG. 20 with the bushing undergoing deformation during the first phase of oscillation between the pivot pin and the bushing in accordance with the exemplary embodiment.

As shown in FIGS. 20 and 22, in one phase of oscillation of the seat assembly 12 where movement occurs between the pivot pin 16 and a corresponding one of the links 32 and 34, the inner annular ring 50 (also referred to as an annular projection) defines and serves as a fulcrum about which the cylindrically shaped portion 40 (also referred to as the cylindrical portion 40) and the outer annular ring 44 of the bushing 18 pivot. In this phase of the oscillation, the gap G changes such that a section of the cylindrically shaped portion 40 of the bushing 18 and a section of the outer surface 60 of the pivot pin 16 now define a gap $G_1$ and while another section of the cylindrically shaped portion 40 of the bushing 18 and another section of the outer surface 60 of the pivot pin 16 define a gap $G_2$.

As is shown in the schematic enlargement of the pivot pin 16 and the bushing 18 in FIG. 22, the gap $G_1$ is greatly reduced as compared to the at rest gap G and the gap $G_2$ is greatly increased as compared to the at rest gap G. Further, the gap $G_2$ defines a first distance $D_4$ adjacent to the inner annular ring 50 and a second distance $D_5$ in the area of the recessed portion 46. The distance $D_4$ is smaller than the distance $D_5$ such that the gap $G_2$ defines an angle with diverging surfaces.

Figure 21:
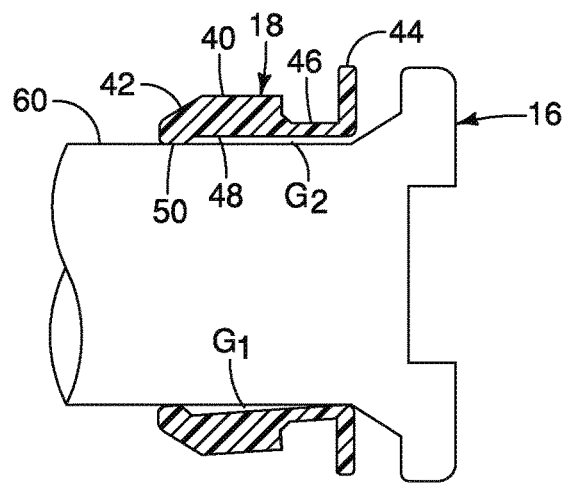
FIG. 21 is still another cross-sectional view of the pivot pin and bushing with the bushing undergoing deformation during a second phase of oscillation between the pivot pin and the bushing in in accordance with the exemplary embodiment.

As shown in FIG. 21, the locations of the gaps $G_1$ and $G_2$ in another phase of the oscillation of the pivot structure 14 of the seat assembly 12. Hence the cylindrically shaped portion 40 of the bushing 18 deflects during the oscillations about the inner annular ring 50, as shown in FIGS. 20, 21 and 22.

It should be understood that these oscillations of the pivot structure 14 are almost unnoticed by a vehicle operator or vehicle passenger moving the seat assembly 12 between the depicted orientations of the seat assembly 12. The bushing 18 reduces and/or completely eliminates any noises or rattling cause by movement of the seat assembly 12 and the accompanying oscillations. Hence, the bushing 18 provides the seat assembly 12 with quiet and smooth movement as far as the vehicle operator and/or vehicle passenger can perceive.

The various elements of the vehicle 10, other than the bushing 18 and the pivot pin 16, are conventional components that are well known in the art. Since these various elements of the vehicle 10 are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section." "portion," "member" or "element" when used in the singular can have the dual meaning of a single part or a plurality of parts. Also as used herein to describe the above embodiment (s), the following directional terms "forward". "rearward", "above", "downward", "vertical", "horizontal", "below" and "transverse" as well as any other similar directional terms refer to those directions of a vehicle equipped with the vehicle seat assembly. Accordingly, these terms, as utilized to describe the present invention should be interpreted relative to a vehicle equipped with the vehicle seat assembly.

The term "configured" as used herein to describe a component, section or part of a device includes structure(s) that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle seat assembly, comprising:
    a pivot structure having at least one link member that includes a pivot pin extending through an opening in the at least one link member, the pivot pin defining a pivot axis about which the at least one link member pivots;
    a seat attached to the pivot structure, the pivot structure and the seat being configured to move between a seating orientation and a rear access orientation; and
    a bushing fitted into the opening of the at least one link member with the pivot pin extending through the bushing, the bushing being configured to elastically deform in response to movement of the link member relative to the pivot pin.

2. The vehicle seat assembly according to claim 1, wherein
    the bushing includes a first end that defines a recess dimensioned to receive and retain a portion of the at least one link member.

3. The vehicle seat assembly according to claim 2, wherein
    the bushing includes a cylindrical portion that extends from the first end encircling the pivot pin.

4. The vehicle seat assembly according to claim 3, wherein
    the cylindrical portion defines a second end of the bushing, the second end having a radially inwardly extending annular projection spaced apart from the first end that contacts and wraps around an outer surface of the bushing.

5. The vehicle seat assembly according to claim 4, wherein
    the pivot pin has an outer surface that defines an outer diameter, and
    the cylindrical portion of the bushing has an inner surface defines a first inner diameter larger than the outer diameter of the pivot pin such that with the pivot structure and the seat in an at rest condition the outer surface of the pivot pin and the inner surface of the cylindrical portion of the bushing have clearance therebetween.

6. The vehicle seat assembly according to claim 5, wherein
    the radially inwardly extending annular projection of the second end of the bushing defines a fulcrum about which the cylindrical portion and the first end of the bushing pivot in response to relative movement between the pivot pin and the at least one link member.

7. The vehicle seat assembly according to claim 4, wherein
    the radially inwardly extending annular projection of the second end of the bushing defines a fulcrum about which the cylindrical portion and the first end of the bushing pivot in response to relative movement between the pivot pin and the at least one link member.

8. The vehicle seat assembly according to claim 3, wherein
    the pivot pin has an outer surface that defines an outer diameter and the cylindrical portion of the bushing has an inner surface defines a first inner diameter larger than the outer diameter of the pivot pin such that with the pivot structure and the seat in an at rest condition the outer surface of the pivot pin and the inner surface of the cylindrical portion of the bushing have clearance therebetween.

9. The vehicle seat assembly according to claim 1, wherein
    the bushing includes a first end and a cylindrical portion that defines a second end of the bushing, the second end being spaced apart from the first end and the second end having a radially inwardly extending annular projection that contacts and wraps around an outer surface of the bushing.

10. The vehicle seat assembly according to claim 9, wherein
    the pivot pin has an outer surface that defines an outer diameter, and
    the first end and the cylindrical portion of the bushing have an inner surface that defines a first inner diameter, the first inner diameter being larger than the outer diameter such that a clearance is defined between the first end and cylindrical portion of the bushing and the pivot pin with the pivot pin inserted into the bushing.

11. The vehicle seat assembly according to claim 10, wherein
    the radially inwardly extending annular projection at the second end of the bushing defines a second inner diameter, such that prior to insertion of the pivot pin into the bushing the second inner diameter is smaller than the outer diameter of the pivot pin and in response to insertion of the pivot pin into the bushing, the radially inwardly extending annular projection at the second end of the bushing expands and presses against the outer surface of the pivot pin.

* * * * *